United States Patent [19]

Varma

[11] 4,295,940
[45] Oct. 20, 1981

[54] METHOD FOR BATTERY PLATE
[75] Inventor: Brajendra P. Varma, Levittown, Pa.
[73] Assignee: Eltra Corporation
[21] Appl. No.: 182,346
[22] Filed: Aug. 29, 1980

Related U.S. Application Data

[62] Division of Ser. No. 64,650, Aug. 7, 1979, Pat. No. 4,230,779.
[51] Int. Cl.³ ............................................. H01M 10/44
[52] U.S. Cl. .................................... 204/2.1; 204/45.5; 204/51; 429/205; 429/228
[58] Field of Search ................. 429/204, 205, 228; 204/2.1, 45.5, 51, 56 R, 290 R, 291

[56] References Cited

U.S. PATENT DOCUMENTS

| 185,160 | 8/1876 | Bastet | 429/204 X |
|---|---|---|---|
| 282,414 | 7/1883 | Van Depoele | 204/2.1 |
| 397,443 | 2/1889 | Shaw | 429/225 |
| 409,291 | 8/1889 | Kookogey | 429/204 X |
| 434,458 | 8/1890 | Pepper, Jr. | 429/228 X |
| 566,231 | 8/1896 | Schafer | 204/2.1 |
| 1,008,854 | 11/1911 | Morrison | 429/228 |

OTHER PUBLICATIONS

Willard Salesmaker, 165, p. 8, Aug., 1949.

*Primary Examiner*—Charles F. LeFevour
*Attorney, Agent, or Firm*—John C. Purdue

[57] ABSTRACT

A manganese or chromium doped positive plate for a lead acid battery, and a method of manufacturing the same is disclosed. Also disclosed is a lead acid battery containing manganese or chromium in the electrolyte. The doped positive plate has increased cycle life, hardness, and resistance to shedding of the active material.

2 Claims, No Drawings

METHOD FOR BATTERY PLATE

This is a division, of application Ser. No. 064,650, filed Aug. 7, 1979, now U.S. Pat. No. 4,230,779.

BACKGROUND OF THE INVENTION

The present invention relates to storage batteries and more specifically to lead-acid type batteries incorporating small amounts of manganese of chromium* to increase cycle life, hardness, and resistance to shedding of the positive plate.

*The terms "manganese" and "chromium" are used to designate any and all of the soluble species thereof that may result when a soluble salt containing manganese or chromium atoms, respectively, is introduced into the electrolyte. Such species may be any simple or complex ions of manganese or chromium, respectively.

The positive plates of secondary batteries usually are formed by one of two general methods, the Plante process and the pasted plate process. The Plante process involves charging and discharging lead electrodes in an electrolytic solution, usually consisting of dilute sulfuric acid, until anodes of lead dioxide (or peroxide) and cathodes of sponge lead are formed. Oftentimes, an oxidizing agent is included within the forming electrolyte to hasten the positive plate formation by attacking the lead and forming lead sulfate which is subsequently converted to the desired lead dioxide.

The pasted plate process is the more commonly used method for the commercial production of lead-acid battery positive plates since the forming time is shorter than for other methods and plates of much greater electrical storage capacity can be obtained. That process involves reacting a paste uslly composed of a plurality of lead oxides including for example, red lead, litharge, and the like, with dilute sulfuric acid to form a paste containing lead sulfate, basic lead sulfate and lead oxide, mechanically affixing the paste to a lead grid designed to secure the paste from removal and then electrolytically oxidizing the pasted plate to form an active material comprised mainly of lead dioxide with small amounts of lead oxide and lead sulfate. The lead sulfate is desirably present in minor quantities as required to provide a paste having the desired final bulk, and also to serve a binding function.

In U.S. Pat. Nos. 292,414 (1883) and 434,458 (1890), manganese compounds in relatively large quantities were disclosed as oxidizing agents to reduce the amount of time necessary to form the Plante electrodes and increase their capacity. In U.S. Pat. Nos. 566,231 (1898) and 911,141 (1909), manganese compounds are disclosed as binding agents for the active material. U.S. Pat. No. 1,640,922 (1927) claims an electrode paste containing 12 percent manganese peroxide to prevent discharge of the electrodes when open-circuited or dry-stored.

Chromates have also been used as oxidizing agents*, and it has been reported that ammonium chromate doubles the life of the positive active material. On the other hand, research published in 1922* reported that manganese caused rapid selfdischarge of lead-acid batteries and severe deterioration of the positive plates. Several years later, Vinal and Altrup** reported that manganese was particularly destructive to the positive plates. Manganese further exhibits a strong and corrosive oxidizing action on some organic materials that may be used in a battery, such as wood separators. Therefore, storage battery specifications since the 1920's typically set maximum manganese impurity levels in lead oxides for electrodes at 0.3 part*** per million (ppm) and in sulfuric acid electrolytes at 0.2 ppm. Chromium has been considered to be detrimental in storage batteries in a manner similar to manganese.

* George W. Vinal, "Storage Batteries", 4th Edition, (New York, 1955), pp. 23 and 132.
** Morton Arendt, "Storage Batteries" (New York 1928), p. 34.
*** Helen C. Gillette, "A Study of Effect of Impurities on Storage Batteries", Trans. Am. Elect. Chem. Soc., XLI (1922).
**** G. W. Vinal and F. W. Altrup, "Effect of Certain Impurities in Storage Battery Electrolytes", Jour. Amer. Inst. Elec. Eng. (1924).
***** The terms "parts" and "percent" are used herein, and in the appended claims, to refer to percent and parts by weight, unless otherwise indicated.

SUMMARY OF THE INVENTION

The present invention provides a manganese or chromium treated positive plate for a lead acid battery, and a method for producing the same. The treated positive plate consists essentially of a lead or lead alloy grid, a composite of lead dioxide, and from 0.1 to 0.4 percent of manganese or chromium, calculated as the metal, based upon the weight of the plate. The plate is manufactured by immersing a lead or lead alloy grid pasted with a typical battery plate paste composition in an electrolyte containing from $1.8 \times 10^{-4}$ to $9.1 \times 10^{-2}$ gram atoms per liter of manganese, chromium, or both, and then applying an electric current thereto. Contrary to the understanding in the industry, such plates, treated with manganese, chromium, or both, in the above described narrow range of proportions have increased cycle life, hardness, and resistance to shedding of the active material as compared to non-treated positive plates. It will be understood that batteries containing such plates must necessarily be made with separators and other ancillary components that will not interfere with the action of manganese or chromium. For example, separator plates, battery cases and other components made of microporous polyethylene and polyvinyl chloride respectively have been found to be operable.

The invention also provides a lead acid battery containing at least one positive plate as above-described, as well as a battery containing at least one standard positive plate, comprised of a lead or lead alloy grid pasted with a lead oxide composition and immersed in an electrolyte containing from $1.8 \times 10^{-4}$ to $9.1 \times 10^{-2}$ gram atom per liter of manganese, chromium or both.

EXAMPLE I

Two lead-calcium-tin (weight ratio 99.92:0.08:1.00) grids, each 0.070 inch thick, were pasted with a medium density paste of lead oxide and air dried. The pasted grids were then soaked for seventeen hours in sulfuric acid having a specific gravity (Sp.Gr.) of 1.100, and charged for 96 hours at the rate of 2 amperes per pound of dry paste. The formed plates so produced were cycled in separate tanks containing 1.210 Sp.Gr. sulfuric acid and $9.1 \times 10^{-3}$ gram atom per liter of manganese, added as $MnSO_4 \cdot H_2O$. For purposes of comparison, but not in accordance with the present invention, two other plates were similarly formed and cycled, but in a cycling bath which contained sulfuric acid only.

The plates were cycled by discharging at 1.75 amperes (approximately the 5-hour rate) and recharged for 17–18 hours at constant current to provide about 10% overcharge. The initial capacity of the plates was about ten ampere hours. The cycling of each pair of plates was continued until the capacity of one of the plates in the pair dropped to 2 ampere-hours. The number of cycles occuring before the capacity dropped to 2 ampere-hours is used herein as the cycle life of the plate, or in this case the cycle life of the pair. The life in cycles of the positive plates cycled in sulfuric acid containing Mn was 2.64 times that of the control (Control I). Furthermore, plates cycled in Mn provided 2.22 times more total energy over the cycle life, measured in ampere-hours, than Control I.

EXAMPLES II-V

The experiment described in Example I was duplicated as Examples II-V, except that the cycling tanks contained $1.8 \times 10^{-4}$, $1.8 \times 10^{-3}$, $1.8 \times 10^{-2}$ and $9.1 \times 10^{-2}$ gram atoms per liter of manganese, respectively, added as $MnSO_4 \cdot H_2O$. The ratios of cycle life and total energy out-put of each pair of experimental plates to those for the Control I plates, are shown in the following Table:

TABLE 1

| EXAMPLE | CONCENTRATION OF MANGANESE (GRAM ATOMS PER LITER) | CYCLE LIFE (EXAMPLE/ CONTROL I) | TOTAL ENERGY OUTPUT (EXAMPLE/ CONTROL I) |
| --- | --- | --- | --- |
| II | $1.8 \times 10^{-4}$ | 1.18 | 1.03 |
| III | $1.8 \times 10^{-3}$ | 1.55 | 1.41 |
| IV | $1.8 \times 10^{-2}$ | 1.82 | 1.60 |
| V | $9.1 \times 10^{-2}$ | 3.00 | 2.22 |

EXAMPLE VI

A lead-calcium-tin grid 0.070 inch thick was pasted with a medium density paste of lead oxide, as described in Example I, but the plate was subsequently cured at high humidity and a temperature of about 80°-100° C. rather than air dried. The high temperature and humidity cure is known to develop different types of compounds in the paste than low temperature cures (see e.g. B. P. Varma and C. W. Fleischmann, *J. Electrochem. Soc.*, 124, 718 (1977).) The plate was formed by soaking it for 16 hours in 1.100 Sp.Gr. sulfuric acid and was charged for 96 hours at the rate of 2 amperes per pound of dry paste. The plate was cycled as described in Example I in 1.210 Sp.Gr. sulfuric acid containing $9.1 \times 10^{-3}$ gram atom per liter of manganese, added in the form of manganese sulfate monohydrate. For purposes of comparison, but not in accordance with the present invention, a control plate (Control VI) was similarly formed and cycled, except that the cycling bath contained sulfuric acid only. The cycle life of the manganese treated plate was 1.84 times that of the plate cycled in sulfuric acid only.

EXAMPLE VII

A lead-antimony grid (Pb-95.7 percent, Sb-3.25 percent Sn-0.4 percent, As-0.5 percent, Ed-0.1 percent and Cu-0.05 percent) 0.070 inch thick was pasted with a medium density paste of lead oxide and air dried. The plate was formed by soaking it for 16 hours in 1.100 Sp.Gr. sulfuric acid and then charging it for 96 hours at the rate of 2 amperes per pound of dry paste. The plate was cycled in 1.210 Sp.Gr. sulfuric acid containing $9.1 \times 10^{-3}$ gram atoms per liter of manganese added in the form of manganese sulfate monohydrate; in cycling, the discharge was at a five hour rate with a current of 1.75 amperes and the recharge was at a constant current for 18 hours. For purposes of comparison, but not in accordance with the present invention, a control plate (Control VII) was similarly formed and cycled, except that the cycling bath contained sulfuric acid only; the capacity of the manganese treated plate on the tenth cycle was 10 percent higher than that of the control. At the end of the life of the control, the capacity of the treated plate was 2.72 times that of the control plate. The cycle life of the treated plate was substantially 20 percent longer than that of the control.

EXAMPLE VIII

A three-cell five-plate battery, constructed from lead-calcium grids pasted with a medium density lead oxide paste was assembled. The calcium content of the grids was 0.03 percent. The plates were soaked for six hours in 1.180 Sp.Gr. sulfuric acid and then formed in 1.180 Sp.Gr. sulfuric acid by charging them for 96 hours at the rate of 2 amperes per pound of dry paste. Following the formation, the cells were repeatedly discharged and charged in 1.210 Sp.Gr. sulfuric acid until each of the cells gave comparable repeated values for capacity. Manganese sulfate monohydrate in 1.210 Sp.Gr. sulfuric acid was then added to two of the cells to produce manganese concentrations of $3.6 \times 10^{-3}$ and $9.1 \times 10^{-3}$ gram atoms per liter, respectively, in the electrolyte therein; the manganese was mixed with the acid and the specific gravity of the acid in each cell was adjusted to 1.210. The battery was then discharged and charged according to the following schedule until the first indication of shorting occurred:

Discharge—4 minutes at 62.5 amperes
Rest—2 minutes
Charge—22 minutes at 14.4 amperes
Rest—2 minutes The weight loss, or amount of shedding, of each positive plate was determined. The positive plate in the cell containing $3.6 \times 10^{-3}$ gram atoms per liter of manganese had 19 percent less shedding than the control positive plate in the cell containing pure sulfuric acid. The positive plate in the cell containing $9.1 \times 10^{-3}$ gram atoms per liter of manganese had 37 percent less shedding than the control plate.

EXAMPLE IX

The steps in Example VIII were repeated, except that the battery grids were of the lead-antimony type.

The positive plate in the cell containing $3.6 \times 10^{-3}$ gram atoms per liter of manganese had 35 percent less shedding, and that in the cell containing $9.1 \times 10^{-3}$ gram atoms per liter of manganese had 42 percent less shedding than the control plate.

EXAMPLES X AND XI

Two lead-calcium-tin grids of 0.070 inch thickness were pasted with a high density water paste of yellow lead oxide. The paste was treated at high humidity and elevated temperature to effect conversion of the yellow oxide to the red oxide which forms electrochrmically more readily. The plates were soaked for 17 hours and then charged for 96 hours, at the rate of 2 amperes per pound of dry paste in 1.100 Sp.Gr. sulfuric acid containing $9.1 \times 10^{-3}$ gram atoms per liter of manganese, added in the form of manganese sulfate monohydrate. One of the plates (Example XI) was then taken out of the forming bath and cycled in another tank containing sulfuric acid, specific gravity of 1.210. The other plate (Example X) was retained for chemical analysis. In cycling, the discharge was at a five hour rate with a current of 1.75 amperes, and the recharge was at a constant current for eighteen hours.

For purposes of comparison, but not in accordance with the present invention, two control plates were similarly formed except that the forming bath contained pure sulfuric acid only, and one (Control XI) was similarly cycled. The remaining control plate (Control X) was retained for chemical analysis. Although the capacity per cycle for both cycled plates was similar in the initial cycles, the capacity of the control plate subsequently began to drop relative to that of the treated plate, such that, at the end of the life of the control plate, the capacity of the manganese formed plate was 3.3 times as great as that of the control. Chemical analysis of each of the plates for Mn is given on the following Table:

|  |  | Mn CONTENT (WEIGHT PERCENT) |
|---|---|---|
| Example X | not cycled | 0.2 |
| Example XI | at the end of the life of the control | 0.2 |
| Control X | not cycled | 0.0 |
| Control XI | at the end of its life | 0.0 |

EXAMPLE XII

Two lead-calcium-tin grids of 0.060 inch thickness were pasted, soaked, formed and cycled as described in Example X, except that the forming bath contained $9.1 \times 10^{-3}$ gram atoms per liter of chromium, added as a chromate, rather than manganese. For purposes of comparison, but not in accordance with the present invention, two control plates (Control XII) were similarly soaked, formed, and cycled except that the forming bath contained pure sulfuric acid only.

Based upon the chromium concentration in the forming bath after formation, the formed plates were calculated to contain 0.33 percent chromium. At the end of the life of the control plates, the chromium treated plates had an average capacity 4.2 times greater than the average for the control plates.

EXAMPLE XIII

The procedure in Example XII was repeated, except that the forming bath contained $9.1 \times 10^{-2}$ gram atoms per liter of chromium. The formed plates were calculated to contain 3.3 percent chromium. The chromium treated plates, after the number of cycles corresponding to end of life for the Control XII plates, had an average capacity per cycle 2.6 times greater than the average for Control XII, above.

It will be apparent that various changes and modifications can be made from the specific details of the invention as set forth in the foregoing discussion, including the Examples, without departing from the spirit and scope of the invention, as defined in the appended claims.

What I claim is:

1. A method of forming a positive plate for a lead acid battery, said method comprising the steps of immersing a lead or lead alloy grid pasted with a lead oxide composition in an electrolyte containing from 10 to 5000 parts per million of at least one element selected from the group consisting of manganese and chromium, and applying an electric current to said grid and said electrolyte thereby introducing from 0.1 to 0.4 percent based upon the weight of said plate of said element into said plate.

2. A method as defined in claim 1 wherein said grid is immersed in an electrolyte containing 500 parts per million of said element.

* * * * *